(12) United States Patent
Flieger

(10) Patent No.: US 6,588,682 B1
(45) Date of Patent: Jul. 8, 2003

(54) WATER JET VENTILATOR

(75) Inventor: Horst Flieger, Schiltach (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 09/437,949

(22) Filed: Nov. 10, 1999

(30) Foreign Application Priority Data

Nov. 13, 1998 (DE) .......................................... 198 52 411

(51) Int. Cl.$^7$ ................................................. E03C 1/08
(52) U.S. Cl. .................... 239/428.5; 239/106; 239/546; 239/552; 239/602; 239/DIG. 19
(58) Field of Search .......................... 239/428.5, 553.3, 239/106, 546, 602, 553.5, DIG. 19, DIG. 23, 552

(56) References Cited

U.S. PATENT DOCUMENTS

| | | | |
|---|---|---|---|
| 3,104,819 A | | 9/1963 | Aghnides .................... 239/106 |
| 3,270,965 A | | 9/1966 | Aghnides |
| 3,979,064 A | | 9/1976 | Nordentoft .................. 239/107 |
| 4,474,329 A | * | 10/1984 | Finkbeiner ................ 239/428.5 |
| 4,637,552 A | | 1/1987 | Finkbeiner et al. ....... 239/428.5 |
| 5,228,625 A | * | 7/1993 | Grassberger ................ 239/602 |
| 5,323,935 A | * | 6/1994 | Gosselin et al. ......... 239/428.5 |
| 5,405,089 A | * | 4/1995 | Heimann et al. ........... 239/602 |
| 5,495,985 A | * | 3/1996 | Nehm et al. .............. 239/428.5 |
| 5,699,964 A | * | 12/1997 | Bergmann et al. .......... 239/602 |
| 5,730,361 A | * | 3/1998 | Thonnes ..................... 239/602 |
| 5,941,462 A | * | 8/1999 | Sandor ........................ 239/602 |

FOREIGN PATENT DOCUMENTS

| | | |
|---|---|---|
| DE | 40 39 337 A1 | 7/1991 |
| DE | 196 42 055 A1 | 4/1998 |
| EP | 0 268 844 A1 | 6/1988 |
| EP | 1 036 889 A1 | 9/2000 |
| FR | 2 392 182 | 12/1978 |
| WO | WO 95/06787 | 3/1995 |

* cited by examiner

Primary Examiner—Christopher Kim
(74) Attorney, Agent, or Firm—Duane Morris LLP

(57) ABSTRACT

A water jet ventilator or aerator is provided for a sanitary fitting such as a faucet. The water jet ventilator has a jacket defining a water inlet and a water outlet, jet splitting obstacles and structure for mixing the jets with air. The ventilator device splits the flowing water into jets, mixes the jets with air and combines the flow into a stream. In the vicinity of the water outlet, the ventilator components in contact with the water are subject to calcification. According to the invention these components are provided with soft and/or water repellent surfaces to reduce or eliminate calcification and to facilitate cleaning. The soft surfaces facilitate cleaning because adhering lime is easily be detached by slight manual deformation of the surfaces to which the lime has adhered.

10 Claims, 2 Drawing Sheets

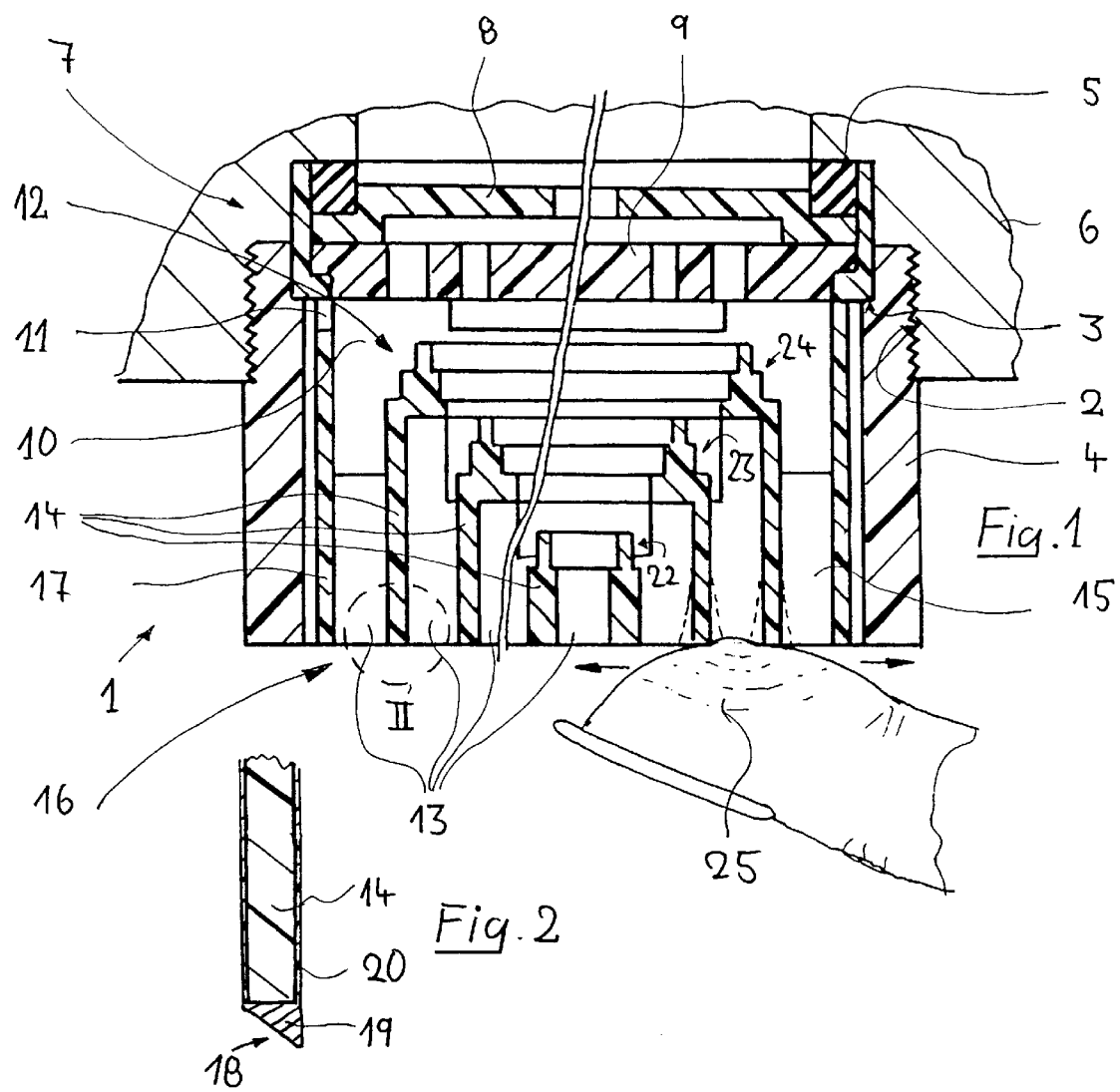

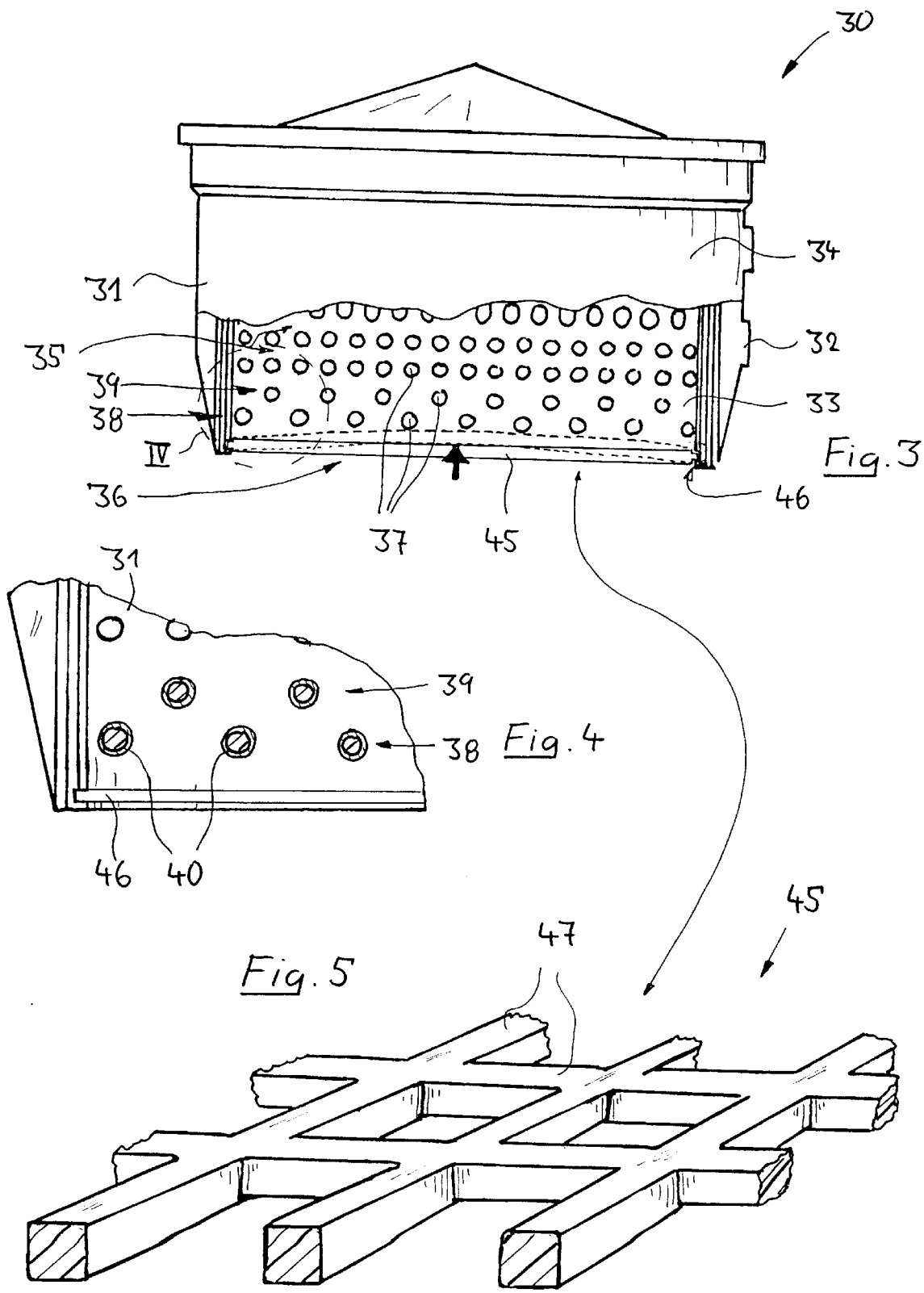

WATER JET VENTILATOR

The invention relates to a water jet ventilator or aerator for connection to a sanitary fitting particularly a water outflow valve or mixer, having a water inlet, a water outlet and devices for splitting up and mixing the inflowing water with drawn in air positioned between the water inlet and the water outlet.

Such water jet ventilators, also known as jet regulators, have a water inlet and a water outlet, as well as devices for splitting up the water flowing into the water jet ventilator positioned between the water inlet and the water outlet and which serve to mix the water with drawn in air. Water jet ventilators are nowadays widely used, because a ventilated or aerated water jet does not splash and allows a quiet inflow of water. In addition, e.g. for washing the hands, the water quantity can be reduced without this having a disadvantageous effect on the cleaning power.

The devices for splitting up and mixing the inflowing water with drawn in air normally operate in a number of stages. Firstly the inflowing water is split up by a device for producing single jets. For this purpose there are normally one or more superimposed perforated plates, the holes normally being staggered. Following this in the flow direction there is normally a free space or a chamber with the possibility of air access from below, so that here air can be drawn in according to the water jet pump principle. The individual jets are then split up in at least one splitting and mixing device following in the flow direction and are mixed with the drawn in air.

Considerable differences exist between conventional water jet ventilators particularly with respect to the devices for splitting up and mixing the individual jets with air. In many of these screen arrangements are provided for this purpose consisting of several fine, superimposed screens, through which the jet is split up and mixing with air is obtained. However, they tend to clog through calcification. To reduce the calcification problem devices have already been proposed which are free from such screens.

EP 151 998 discloses a screenless water jet ventilator which is provided below the individual jet production devices and the air chamber with several concentric, terraced devices for splitting up the individual jets and accompanied by a simultaneous mixing with air, to which are connected concentric guide channels, which serve to calm and stabilize the water/air mixture. The guide channels have common partitions formed by concentric sleeves, whose height increases from the inside to the outside and which are cross-sectionally constructed in the manner of step pyramids, i.e., they pass in terraced manner to either side. This geometrically relatively complex structure has only a limited calcification tendency and permits the formation of a uniformly ventilated full jet.

In a screenless jet regulator known from DE 196 42 055 the calcification problem is counteracted in that for splitting up the individual jets and the mixing thereof with air, in the flow direction is provided a multilayer arrangement of pins arranged transversely to the flow direction and which are parallel to one another. As a result intersections are avoided, which in conventional screen structures are favoured points for the accumulation of water and subsequent lime formation or calcification.

The problem of the invention is to further improve known water jet ventilators with regards to their calcification behavior.

According to the invention this problem is solved in that in a known water jet ventilator at least one component of the water jet ventilator coming into contact with water in the vicinity of the water outlet is provided at least in said water outlet area with a soft and/or water-repelling surface. The term water-repelling surface is in particular intended to cover those surfaces which as a result of external pressure are easily and in particular reversibly deformable, i.e. preferably elastic, flexible surfaces. Water-repelling in the sense of the invention is a property of a surface if, as a result of its chemical and/or physical characteristics and/or its structure is only wetted with difficulty by water, i.e. has a high inter-facial energy relative to water.

The invention is based on a solution fundamentally differing from the prior art, in that an attempt is not or not only made by means of a specific geometrical arrangement of components and/or their purpose-design shaping to increase the security against calcification, but instead to a particular extent surface characteristics of components are influenced, which are in particular located in the calcification-endangered area of the water outlet. If a water tap or the like is switched off, then normally residual water continues to adhere to components in the vicinity of the water outlet and slowly evaporates, so that normally a lime residue is left behind at the attachment point of the evaporated droplet. The resulting calcification more particularly occurs in the vicinity of the outlet end due to gravity and as a result said end can slowly clog or block.

According to the proposal of the invention at least the area of the outlet end is made lime-repelling in that at the endangered surfaces either water droplets do not adhere or only adhere to a limited extent or with a limited volume or their contact surface with the component is so small that only quasi-punctiform lime residues are left behind. As a function of the surface characteristics alternatively or additionally in the case of soft surfaces possibly deposited lime can be removed and detached by slight deformation or bending of the component surface. Thus, on the one hand calcification can be avoided or minimized from the outset and alternatively or additionally easier cleaning possibilities can be created for calcified elements in the vicinity of water outlets.

As the invention substantially relates to the surface characteristics of jet guidance elements and/or jet obstacles in the vicinity of the water outlet, the invention can be used with advantage in all water jet ventilators and optionally their geometry optimized with respect to calcification and/or other characteristics can be largely or completely retained. Preferably, the invention is implemented with screenless jet ventilators or regulators.

The invention can be implemented in different ways. Thus, it is e.g. possible for at least one of the particularly calcification-endangered components of said type to be made substantially completely from a soft and/or water-repelling material, particularly from a corresponding plastic. Components made from suitable solid material can generally be particularly inexpensively manufactured. The construction from solid material is particularly intended for those components which, as a result of their dimensioning and/or shaping have a certain shape stability and/or those which in the operation of the water jet ventilator have boundary surfaces substantially parallel to the flow direction, so that they are only moderately affected by the flowing water. Thus, the components, e.g. axial guidance elements, can be generally made from soft, particularly elastomeric plastic, such as silicone rubber or the like and in particular from thermoplastic elastomers. The thermoplastic elastomers e.g. include Santopren®, a polymer based on polypropylene and EPDM (ethylene/propylene/diene terpolymer). It is also possible to use primarily water-repelling materials, such as polytetrafluoroethylene (PTFE) or silicones, such as silicone resins. In the case of a correspondingly thin construction they can also have an adequate softness or flexibility. In the case of components, whose calcification-reducing characteristics are essentially based on the surface softness, it must in particular be ensured that at least the area of the soft surface is manually accessible, so that any deposited lime can be manually removed by deformation of the components or can be chipped off. Particularly suitable are soft materials with a hardness between approximately 20 and approximately 80 Shore A and for solid material components hardnesses in the upper range, e.g. between 50 and 80 Shore A, particularly approximately 80 Shore A are preferred, so as to give the components a certain dimensional stability in spite of the desired flexibility.

It is also possible for at least one component, at least in the vicinity of the water outlet, to have a coating or covering of a soft and/or water-repellent material. This coating can be applied to a support, whose mechanical characteristics essentially determine the volume properties of the component, such as stiffness or the like, whilst the coating creates the desired surface characteristics. Particular preference is given to water-repellent coatings with hydrophobic plastics, e.g. silicone or polytetrafluoroethylene, which can be applied to the support structure e.g. by spraying, dipping or other suitable processes.

Primarily water-repellent coverings can be very thin and generally only insignificantly change the geometry of the support structure. Preferred coating thicknesses can here be less than 0.1 mm, particularly between approximately 1 and 10 μm. In the case of a coating with a primarily soft material it is preferably ensured that the coating thickness is dimensioned in such a way that the coating is intrinsically movable, particularly compressible, in order to encourage the chipping off of lime residues by pressure on the coating. Coating thicknesses of more than 0.1 mm, particularly between 0.2 and 0.4 mm can be appropriate. As in the case of coatings the volume characteristic of the component, such as its stiffness, is essentially determined the support material, the material of the coating, whose hardness is appropriately between approximately 20 and approximately 80 Shore A, can be located in the lower part of this hardness range, e.g. between approximately 20 and approximately 50 Shore A. Even limited stripping forces are sufficient to bring about a deformation causing lime to be chipped off.

According to another embodiment, points, particularly edges of components located at the water outlet are provided with a thicker coating and/or are constructed in pointed or knife blade-like manner in the water outlet direction. On the one hand this improves the deformability and on the other brings about a good detachment of the water droplets. The coating thickness at these points can be up to 2 mm or more.

The advantages of the invention can also be utilized in that with the water jet ventilator is associated at least one component in the form of a flat or surface element through which there is a flow and positioned or positionable close to the water outlet and which has a soft and/or water-repellent surface. The flat element can be designed in such a way that it substantially covers the entire cross-section of the water outlet and forms a lower termination of the water jet ventilator, where preferably residual water collection takes place. Thus, further inwardly positioned components are better protected from the outset against lime accumulations, because residual water generally sticks to the furthest downwardly positioned parts. Simultaneously a protection of the inner components against mechanical damage is provided.

The flat element can in particular be a grid or grating with randomly designed water outlets. It can in particular be a rectangular, diamond-shaped or honeycomb grating. Spiral or perforated disk-like flat elements are also possible. At least in the through-flow area, the flat element can be substantially completely made from soft and/or water-repellent material or can be coated with such a material.

Preferably the flat element is constructed as an insert detachably connectable to the water jet ventilator. A flat element can also be connected in fixed form to the water jet ventilator, e.g. molded into the same.

In preferred embodiments all components of the jet ventilator or regulator which come into contact with water, have water-repelling surface characteristics, at least those which also come into contact with air and where an evaporation of water can take place.

These and further features of the invention can be gathered from the following description of preferred embodiments in conjunction with the subclaims and drawings. The individual features can be implemented singly or in the form of combinations. In the drawings show:

FIG. 1 Two juxtaposed axial sections through two embodiments of inventive water jet ventilators, which are substantially identical with regards to the geometry of their components.

FIG. 2 A larger scale detail view of the encircled area I of the left-hand embodiment of FIG. 1.

FIG. 3 A partly broken away side view of another embodiment of an inventive water jet ventilator with a circular grating inserted in the area of the water outlet.

FIG. 4 A larger scale detail view of the encircled area IV of FIG. 3 without a grating.

FIG. 5 A larger scale, detail perspective view of the grating structure of FIG. 3.

FIG. 1 shows two juxtaposed, differing embodiments of a substantially cylindrical water jet ventilator or aerator 1, both embodiments being identical with regards to the geometry of the components and are therefore jointly represented. In per se known manner the water jet ventilator is fixed by a sleeve 4 having an external thread 2 and a bearing shoulder 3 and accompanied by the interposing of a packing ring 5, to the outlet of a water tap or faucet 6 or an intake for a bath tub or the like. The water jet ventilator 1 is an example of the jet regulators of the type shown in EP 151 998, whose geometrical features regarding arrangement and/or dimensioning of individual components can be implemented in substantially unchanged form in inventive water jet ventilators.

Considered in the flow direction, the ventilator 1 essentially comprises four functional units. These are a device 7 for producing individual water jets, the device comprising two perforated plates 8 and 9 with staggered holes, an air space 10 located below it and which is supplied with suction, air through lateral openings 11, several concentric, terraced devices forming jet spitting 12 for splitting up the individual jets accompanied by a simultaneous mixing with air, as well as connected, concentric guide channel 13. The guide channels have common partitions 14 and additional radial partitions 15, which at least at the outlet side are so thin that the air/water flows on passing out of the ventilator 1 combine to form a single, joint ventilated water jet.

There are four cylindrical sleeves 14 and 17 concentric to one another and serving as boundary or partition walls, which in the area of the water outlet 16 terminate in a common exit plane for the ventilated jet and bound four passage channels 13, the central channel being cylindrical and the channels arranged around it are constructed as ring or circular channels, which are interrupted by eight web-like, radial partitions 15. The outermost sleeve forms the outer jacket 17 of the jet ventilator with a conventional external diameter, which is provided in the upper region with a steplike widening or extension used for bearing on the shoulder 3 of the fixing sleeve 4.

As can be seen in FIG. 2, the lower edges 18 of the partitions directed in the water outlet direction can be tapered, particularly asymmetrical, which facilitates the dripping of water. This preferably applies not only to the material of the partitions 14. As shown, a correspondingly tapered lower edge 19 can be constructed from the material of the coating 20.

The sleeves become increasingly long from the inside to the outside and carry on their upper ends annular attachments 22 to 24, which are cross-sectionally constructed in the manner of step pyramids, i.e. are terraced to either side. The attachments 22 to 24, which bring about a splitting up of the individual jets formed by the lower perforated plate, are axially inwardly staggered in funnel-shaped manner and can therefore be mutually arranged with short radial spacings, without impairing the flow cross-section for the air/water mixture between the attachments. The resulting dense arrangement of the jet splitting obstacles 12 with respect to the cross-section of the jet ventilator encourages the formation of a well ventilated full jet over the entire cross-section of the ventilator. The air/water mixture as split into several cascades flows through the concentric guide channels 13 to the water outlet 16.

Particularly as a result of the smooth-walled limitation or boundary of the guide and outflow channels 13 and the absence of jet splitting screens towards its interior, the jet ventilator only has a limited calcification tendency. To further improve the calcification behaviour in the right-hand embodiment the partitions 14 and the jet spitting obstacles or devices 12 connected in one piece thereto are made from a relatively soft plastic with a Shore A hardness of approximately 70 to 80, e.g. a corresponding silicone elastomer. Material with such a hardness gives the components an adequate stability in the vicinity of the cross-sectionally wider step parts, but in the vicinity of the outlet 16, permits a slight manual bending of the free ends of the guide sleeves 14, which are readily accessible in this area, e.g. with a fingertip 25 and as can be gathered from the broken line representation. As a result a very easy and effective cleaning possibility is created, particularly in the especially calcification-sensitive area of the outlet 16, where residual water can adhere in preferred manner, evaporates and is deposited in lime residue form. With the easy manual bending possibility with respect to the partition ends, any deposited lime chips off or is at least detached to such an extent that during the next flushing of the jet ventilator the released lime deposits are flushed out.

The left-hand embodiment does not solve the calcification problem primarily by a facilitated cleaning possibility, but in that calcification is avoided from the outset by a special design of the surface characteristics of the partitions in the vicinity of the outlet. Thus, in this embodiment the sleeves 14 are completely covered with an approximately 10 $\mu$m thick coating 20, which in this case, comprises polytetrafluoroethylene and can e.g. be applied by dip coating or spraying of the parts to be coated. As a result of the closed coating 20 the entire surface in contact with water of said sleeves 14, 17 is made water-repelling, in that the interfacial energy with respect to water is so reduced that surface wetting is substantially prevented. After turning off the water tap, any residual water drips away and any remaining small drops preferably collect at the lowest points of the sleeves, i.e. generally on the lower face. Following evaporation of the water only on the small-area contact points between water droplets and the coating are there any lime residues, which due to their position outside the water guidance channels do not impair the function of the water jet ventilator and can be easily wiped off by hand due to their external position. As the outlet-near surfaces of the water splitting and guiding device are more liable to calcification than the terraced portions due to the easier air access, it may be adequate to e.g. only coat the part of the cylindrical guides 14, whilst leaving the area of the step portions 22 to 24 uncoated. Coating is possible both on relatively hard, conventional materials and inventive, soft components in much the same way as in the right-hand embodiment. Thus, the components can e.g. be made from a rubber-like material, which is provided with a thin, water-repelling coating.

Other possibilities for a practical, cost-effective implementation of the invention are explained relative to FIGS. 3 to 5. The jet regulator 30 shown therein has a hinged, sleeve-like casing 31, which is formed by two sleeved halves 33, 34 joined in articulated manner by means of film hinges 32. Also in this embodiment in the concealed upper area a perforated plate produces individual jets, which in the vicinity of a splitting and ventilating device 35 are split up, mixed with drawn in air and subsequently delivered through a lower, circular water outlet 36. The splitting device 35 essentially comprises several successive layers of pins 37 which are arranged in parallel transversely to the flow direction and which are formed by pairwise associated pin portions aligned with one another when the device is folded up. The pin portions are in each case connected in one piece with the associated sleeve halves and abut with one another in the folded up state by means of frontal, complementary holding contours. The shaping and dimensioning of the jet regulator 30 can be the same as for the jet regulator of DE 196 42 055.

Due to the absence of screens and also due to the absence of intersections between the pins, the jet forming device of this water jet ventilator has only a limited calcification tendency. The calcification tendency can be further reduced if at least the splitting pins 38 close to the water outlet and optionally also the layer of pins 39 upstream in the flow direction, are coated with a hydrophobic coating 40, as is diagrammatically shown in the larger scale detail view of FIG. 4. This coating 40, which is only a few micrometers thick and which can e.g. be of silicone or polytetrafluoroethylene, can be applied following the injection molding of the sleeve parts 33, 34, e.g. by the dip coating of the sleeve halves or by spraying. The water-repellent coating 40 only allows a limited accumulation of residual water in the area of the water outlet 36, because the residual water contracts to form spherical water droplets and which easily drip off the cross-sectionally circular pins without sticking thereto. In particular, residual water drops are avoided, which in the case of untreated jet ventilators of this type can adhere in bridge-like manner between neighboring pins of a layer or neighboring layers.

By means of FIGS. 3 and 5 a further possibility is explained for using the inventive advantages inexpensively both in numerous conventional water ventilators and also in future ventilators. In the case of the water jet ventilator 30 the pin layer 38 closest to the outlet is inwardly offset by about 1 to 1.5 mm compared with the plane of the water outlet 36. Into the remaining free space is inserted a grid or grating 45 completely filling the cross-section of the water outlet. In the represented embodiment said grating is manufactured as a separate component and has been inserted prior to the folding together of the casing halves 33, 34. When the casing is completely fitted the grating 45 is positively held in a suitable receptacle 46 and rests in wobble-free manner on the lower casing end. A closing grating or the like can also be firmly connected to a casing of the jet ventilator, e.g. by molding the grating structure following the production of the casing.

The flow-through flat or surface element formed by the rectangular grating 45 (FIG. 5) forms the component structure of the ventilator coming into contact with water and closest to the water outlet 36 and preferably serves as a residual water collection point. Through the grating 45 residual water is more particularly also removed from the pin layer 38 closest to the opening, because droplets collecting there can easily bridge a gap to the grating and can "climb down" to the grating. In order to utilize the advantages according to the invention, at least in the through-flow inner area, such a flat element can be made from a soft and/or water-repelling material or can be coated with such. The preferably wide-meshed grating structure can be adapted to the flow geometry of the splitting and mixing device and can e.g. have a rectangular (FIG. 5), diamond-shaped, honeycomb or radial arrangement of grating stays 47. Flat elements in the form of spiral inserts or perforated disks are also possible.

If the self-supporting flat element, as in the preferred embodiment of FIG. 3, is made from an adequately soft material with a Shore A hardness of e.g. between 50 and 80, lime residues which preferably form at the exposed underside of the grating, can be detached or chipped off by pressing in the grating (arrow) and the resulting bending thereof (broken lines). Particularly in the case of soft gratings, it is therefore suitable to provide a free space 48 of approximately 0.5 to 1 mm between the last component structure of splitting and guiding device facing the grating and formed by the pin layer 38 and it is preferably dimensioned in such a way that inner components can serve as a stop for avoiding an unnecessarily great, structure-hazarding bending.

In a not shown variant, the supporting grating structure is made from relatively hard, flexurally stiff plastics material and subsequently coated with an approximately 10 μm thick silicone resin layer. This gives the grating a water-repelling surface, from which residual water largely drips off and only small droplets form on the underside of the grating. The lower edges of the grating or the underside of the grating stays are advantageously tapered, as in the embodiment according to FIG. 2.

The invention more particularly proposes in the case of water jet ventilators or jet regulators of any random construction to provide the normally plastic parts at the lower outlet end, where residual water collects in preferred manner due to gravity, either with a soft and/or water-repelling coating or to construct the actual components with a corresponding plastic. Preferred materials which, as a function of the material thickness, can be both adequately soft, but in particular also water-repelling, are inter alia the polytetrafluoroethylene known as Teflon, silicone resin or silicone rubber or other plastics having comparable characteristics, particularly elastomeric thermoplastics. Through the use of such materials for the manufacture and/or coating of outlet-near components in water jet ventilators an extremely cost-effective possibility is created for achieving a better calcification protection for such ventilators.

What is claimed is:

1. Water jet ventilator for ventilating water flowing through the water jet ventilator and for forming an aerated water jet comprising a mixture of water and air, the water jet ventilator being adapted for connecting the water jet ventilator to a water outlet end of a sanitary fitting, the water jet ventilator comprising:

a water inlet for receiving water flowing from the sanitary fitting into the water jet ventilator;

a water outlet for discharging water out of the water jet ventilator and;

ventilation devices disposed between the water inlet and the water outlet for splitting up and mixing the inflowing water with drawn-in air;

the ventilation devices comprising a plurality of components coming into contact with water flowing from the water inlet to the water outlet;

wherein at least one of said components comprises a surface for contacting the water, the at least one of said components having a deformably soft portion at least in a vicinity of the water outlet, structured such that deforming the deformably soft portion can detach hard residues deposited on the deformably soft portion and the residues can be flushed away by a subsequent flow of water through the water jet ventilator; and, wherein the plurality of components comprise components having areas located at the water outlet and wherein the areas include a tapering shape in a water outflow direction.

2. The water jet ventilator according to claim 1, wherein the at least one of the plurality of components comprises a plastic material.

3. The water jet ventilator according to claim 1, wherein said at least one of said components is adapted to be positioned such that at least an area of the deformably soft portion is manually accessible.

4. The water jet ventilator according to claim 1, wherein the deformably soft portion is water-repellent.

5. The water jet ventilator according to claim 1, wherein the at least one component is substantially completely made form soft material with a hardness in the range of at least one of more than 60 Shore A and around approximately 80 Shore A.

6. The water jet ventilator according to claim 1, wherein a surface of the deformably soft portion comprises one of silicone rubber and polytetrafluoroethylene.

7. The water jet ventilator according to claim 1, wherein the deformably soft portion is more deformably soft than the hard residues.

8. The water jet ventilator according to claim 1, wherein the tapering shape comprises a thin portion and a thick portion wherein a cross-section of the thin portion is thinner than a cross section of the thick portion and wherein the thin portion is closer to the water outlet than the thick portion, whereby the component is more readily deformable in the thin portion in the vicinity of the water outlet, and more stable in the thick portion for splitting up inflowing water.

9. The water jet ventilator according to claim 1, wherein the at least one of said components is substantially completely made of a soft material.

10. Method for manufacturing a water jet ventilator for ventilating water flowing through the water let ventilator and for forming an aerated water jet comprising a mixture of water and air, the water jet ventilator being adapted for connecting the water jet ventilator to a water outlet end of a sanitary fitting, the method comprising forming:

a water inlet for receiving water flowing from the sanitary fitting into the water jet ventilator;

a water outlet for discharging water out of the water jet ventilator and;

ventilation devices disposed between the water inlet and the water outlet for splitting up and mixing the inflowing water with drawn-in air;

the ventilating devices comprising a plurality of components coming into contact with water flowing through the water jet ventilator;

wherein at least one of said components is formed with a surface for contacting the water, structured to permit removal of deposits, the method comprising providing a deformably soft portion at least in a vicinity of the water outlet, whereby deforming the deformably soft portion can detach hard residues deposited on the deformably soft portion; and, wherein providing the deformably soft portion comprises tapering at least part of the plurality of components at the water outlet, in a water outflow direction.

* * * * *